(12) United States Patent
Sugai (10) Patent No.: US 8,567,552 B2
(45) Date of Patent: Oct. 29, 2013

(54) STEER-BY-WIRE STEERING DEVICE

(75) Inventor: Tomohiro Sugai, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/696,910

(22) PCT Filed: May 9, 2011

(86) PCT No.: PCT/JP2011/060624
§ 371 (c)(1),
(2), (4) Date: Nov. 8, 2012

(87) PCT Pub. No.: WO2011/142301
PCT Pub. Date: Nov. 17, 2011

(65) Prior Publication Data
US 2013/0075185 A1    Mar. 28, 2013

(30) Foreign Application Priority Data

May 13, 2010    (JP) .................................. 2010-110936

(51) Int. Cl.
*B62D 5/02*    (2006.01)

(52) U.S. Cl.
USPC .......................................................... 180/402

(58) Field of Classification Search
USPC .......................................................... 180/402
See application file for complete search history.

(56) References Cited

U.S. PATENT DOCUMENTS

| 8,087,488 B2 * | 1/2012 | Onuma et al. | 180/404 |
| 2006/0042859 A1 * | 3/2006 | Itoh | 180/402 |
| 2006/0201733 A1 * | 9/2006 | Dominke et al. | 180/402 |
| 2011/0276231 A1 | 11/2011 | Suzuki et al. | |

FOREIGN PATENT DOCUMENTS

| JP | 2002-120736 | 4/2002 |
| JP | 2005-205923 | 8/2005 |
| JP | 2006-125611 | 5/2006 |
| JP | 2007-22462 | 2/2007 |
| JP | 2008-121867 | 5/2008 |
| JP | 2010-163016 | 7/2010 |

OTHER PUBLICATIONS

International Preliminary Report on Patentability issued in corresponding PCT Application No. PCT/JP2011/060624 mailed Dec. 20, 2012.
International Search Report of Corresponding PCT Application PCT/JP2011/060624 mailed Jul. 12, 2011.
International Preliminary Report on Patentability issued in corresponding PCT Application No. PCT/JP2001/060624 mailed May 9, 2011.

* cited by examiner

*Primary Examiner* — Tashiana Adams (57) ABSTRACT

A steer-by-wire steering device includes a steering wheel connected with a steering shaft, a steering angle sensor, a steering reactive force motor, and a steering control unit for controlling a steering shaft drive motor and the steering reactive force motor. Provided is a power transmitting mechanism for transmitting the power from the steering shaft drive motor to the steering shaft. A changeover unit for selectively connecting and disconnecting the power is disposed on the way thereof. The changeover unit includes a clutch mechanism comprised of an input member and an output member juxtaposed in an axial direction for movement in the axial direction and, also, rotatable relative to each other, a clutch groove provided in one of those members, and a clutch rolling element provided in the other of those members and biased in a radial direction by the clutch groove so that it can be selectively engaged and disengaged.

13 Claims, 8 Drawing Sheets

STEER-BY-WIRE STEERING DEVICE

CROSS REFERENCE TO THE RELATED APPLICATION

This application is a U.S. National Phase application of PCT/JP2011/060624 filed May 9, 2011 and claims the non benefit of Japanese Application No. 2010-110936 filed May 13, 2010 in the Japanese Intellectual Property Office, the contents of both of which are incorporated herein by reference.

BACKGROUND OF THE INVENTION 1. (Field of the Invention)

The present invention relates to a steer-by-wire steering device of a kind, in which steering is accomplished by means of steering wheel that is not mechanically coupled with a steering axle for wheel turning purpose.

2. Description of Related Art

In this type of the steer-by-wire steering device, the arrangement has been suggested in which by moving a shaft member having a spline in an axial direction, transmission of a power in a power transmitting mechanism is switched (see the patent document 1 listed below). In the case of a splined engagement mechanism according to this patent document 1, the power is selectively connected or disconnected by moving the shaft member of a type, having an outer peripheral surface formed with male spline teeth, in an axial direction relative to a tubular member of a type, having an inner peripheral surface formed with female spline teeth, to thereby engage or disengage the male spline teeth with the female spline teeth.

Also, although in the splined engagement a phase matching is required at the time when the male spline teeth are engaged with the female spline teeth, the use of a tapered element as a phase guide element at an end portion of each of the spline teeth and grooves has been suggested as a means for facilitating such splined engagement (see the patent document 2 listed below).

PRIOR ART LITERATURES

[Patent Document 1] JP Laid-open Patent Publication No. 2010-163016
[Patent Document 2] JP Laid-open Patent Publication No. 2005-205923

DISCLOSURE OF THE INVENTION

In the spline engagement mechanism disclosed in the patent document 1 listed above, when the male spline teeth on the shaft member and the female spline teeth on the tubular member are to be engaged with each other, such engagement will not accomplished unless the male spline teeth and the female spline teeth are out of phase relative to each other and, therefore, the phase matching is needed where the splined engagement is desired to be accomplished smoothly.

Also, even where the use of the tapered elements are employed at the ends of in the spline teeth and the spline grooves as the phase guide elements, it has been difficult to accomplish the assured engagement of the spline teeth with the spline grooves quickly in a matter of seconds.

In view of the foregoing, the present invention is intended to provide a steer-by-wire steering device capable of accomplishing the connection and disconnection of the power in the power transmitting mechanism in a matter of seconds but accurately.

In order to accomplish the foregoing object, the present invention provides a steer-by-wire steering device including a steering wheel not mechanically connected with a steering shaft for turning, a steering angle sensor for detecting a steering angle of the steering wheel, a steering reactive force motor for applying a reactive force torque to the steering wheel, a steering shaft drive motor for driving the steering shaft and a steering control unit for controlling the steering reactive force motor and the steering shaft drive motor. The steering shaft drive motor is controlled by the steering control unit on the basis of a driving condition detection signal including a signal indicative of the steering angle detected by the steering angle sensor. The steer-by-wire steering device further includes a power transmitting mechanism for transmitting a power from the steering shaft drive motor to the steering shaft, and a changeover unit disposed at a location generally intermediate of the power transmitting mechanism for switching between a condition for transmitting the power and a condition for interrupting the power. The changeover unit refereed to above includes a clutch mechanism comprising an input member and an output member juxtaposed in an axial direction with respective ends thereof held in contact with each other for movement in the axial direction and, also, rotatable relative to each other, a clutch groove provided in one of the input member and the output member so as to extend axially, and a clutch rolling element provided in the other of the input member and the output member and being selectively engaged and disengaged in and from the clutch groove as biased by an elastic member in a radial direction upon relative movement of the input and output members in the axial direction.

According to the above described construction, since the switching operation of selectively connecting and disconnecting the input member with and from the output member is performed by the use of the clutch mechanism operable to selectively engage and disengage the clutch rolling element with and from the clutch groove, when the phase of the clutch rolling element and the phase of the clutch groove are matched with each other, the clutch rolling element engages with the clutch groove. Since there is no need to align the phase during the switching operation, the switching operation can be performed assuredly and in a reduced time.

In the present invention, one of the input member and the output member may be a shaft member, in which case the other of the input member and the output member is a member connected with the shaft member for rotation together therewith and having an engagement hole for engaging with an outer periphery of such one of the members in an axially relatively movable fashion.

In the present invention, as the power transmitting mechanism, separate from a turning power transmitting mechanism for transmitting the power from the turning motor, which is one of the steering shaft drive motors, to the steering shaft, there may be provided a toe angle adjusting power transmitting mechanism for transmitting from a toe angle adjusting motor, which is another one of the steering shaft drive motors, to the steering shaft to perform a toe angle adjustment such that in the event of failure of the turning motor, the power of the toe angle adjusting motor is transmitted by the clutch mechanism of the changeover unit to the turning power transmitting mechanism to enable the toe angle adjusting motor to perform the turning.

According to the above described construction, separate from the turning motor and the tuning power transmitting mechanism for transmitting the power from the turning motor to the steering shaft, the provision is made of the toe angle adjusting motor and the toe angle adjusting power transmitting mechanism for transmitting the power from the toe angle adjusting motor to the steering shaft to perform the toe angle adjustment. Therefore, in the event of failure of the turning motor, the power of the toe angle adjusting motor is transmitted by the clutch mechanism of the changeover unit to the turning power transmitting mechanism to perform the turning by means of the toe angle adjusting motor. For this reason, even in the event of failure of the turning motor used to turn the vehicle wheel, the turning can be performed by the utilization of the toe angle adjusting motor as a drive source for the turning. Also, even when the turning motor is normally operating, the toe angle adjusting motor functions as a drive source for adjusting the toe angles of the vehicle wheels, and, therefore, it can be an economical structure as compared with the conventional case in which an auxiliary motor that is activated only in the event of failure of the turning motor is employed.

In the present invention, the changeover unit may include a second clutch mechanism, which is identical in structure with the first mentioned clutch mechanism and having the output member axially movably, but non-rotatably supported relative to a housing such that when the turning is to be performed by means of the toe angle adjusting motor, the toe angle adjusting power transmitting mechanism is locked by the second clutch mechanism of the changeover unit.

In the present invention, a member of the input member and the output member in the clutch mechanism, which is provided with the clutch mechanism, may be provided with a round sectioned non-grooved surface coaxial with a center axis of a member so as to be juxtaposed axially in adjoining relation to the clutch groove. The power transmission from the input member to the output member is interrupted when the clutch rolling element assumes an axial position confronting the non-grooved surface, but when the clutch rolling element assumes an axial position confronting the clutch groove, the clutch rolling element engages in the clutch groove to enable the power transmission from the input member to the output member.

In the present invention, the member of the input member and the output member in the clutch mechanism, which is provided with the clutch groove, may be provided with a bearing that is axially neighboring the clutch groove. The power transmission from the input member to the output member is interrupted when the input member and the output member are axially moved by the effect of an external force and the clutch rolling element assumes an axial position confronting a raceway ring peripheral surface of the bearing, but when the clutch rolling element assumes an axial position confronting the clutch groove, the clutch rolling element engages in the clutch groove to enable the power transmission from the input member to the output member. In such case, the bearing may be a rolling bearing.

In the present invention, the clutch rolling element may be radially biased by a spring.

In the present invention, the clutch groove preferably has a sectional shape which is trapezoidal.

In the present invention, the clutch groove may have a groove bottom surface at one end adjoining the non-grooved surface or adjoining the raceway ring peripheral surface of the bearing, which bottom surface at one end may be rendered to be a tapered surface gently inclined towards the non-grooved surface or the raceway ring peripheral surface of the bearing. Where the groove bottom surface at that end of the clutch groove is rendered to be the tapered surface in this way, the selective engagement and disengagement of the clutch rolling element relative to the clutch groove can be accomplished smoothly.

In the present invention, the clutch rolling element may be a ball. Alternatively, it may be a pin.

In the present invention, a position of installation of the clutch rolling element may be a plurality of positions adjoining to each other in an axial direction. Where the position of installation of the clutch rolling element is chosen to be the plurality of the positions in this way, the torque capacity of the power transmission can be increased.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
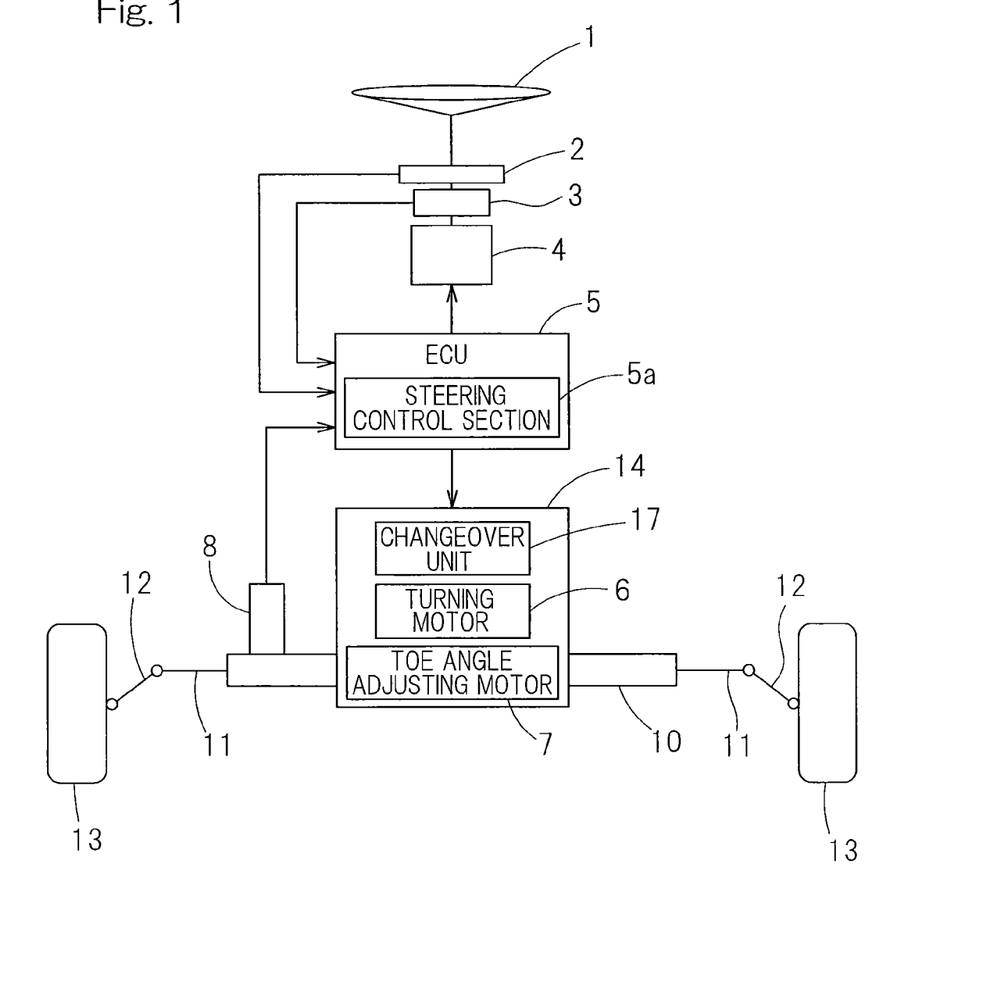
FIG. 1 is a block diagram showing a schematic structure of a steer-by-wire steering device designed in accordance with a preferred embodiment of the present invention.

A first embodiment of the present invention will be described in detail with reference to the accompanying drawings. A steer-by-wire steering device includes, as shown in FIG. 1 in a schematic representation, a steering wheel 1 adapted to be steered by a vehicle driver, a steering angle sensor 2, a steering torque sensor 3, a steering reactive force motor 4, a steering axle 10 movable in a direction axially thereof for wheel turning and coupled with left and right vehicle wheels 13 through corresponding knuckle arms 12 and tie rods 11, a steering axle drive unit 14 for driving the steering axle 10, a turning angle sensor 8, and an ECU (Electric Control Unit) 5 including a steering control section 5a. The ECU 5 and its steering control section 5a are constituted by an electronic circuit or the like including a microcomputer and its software control program.

The steering wheel 1 is not mechanically connected with the steering axle 10 for wheel turning purpose. To the steering wheel 1, the steering angle sensor 2 and the steering torque sensor 3 are provided and the steering reactive force motor 4 is connected. The steering angle sensor 2 is a sensor for detecting the steering angle of the steering wheel 1. The steering torque sensor 3 is a sensor for detecting the steering torque acting on the steering wheel 1. The steering reactive force motor 4 is a motor for applying a reactive force torque to the steering wheel 1.

Figure 2:
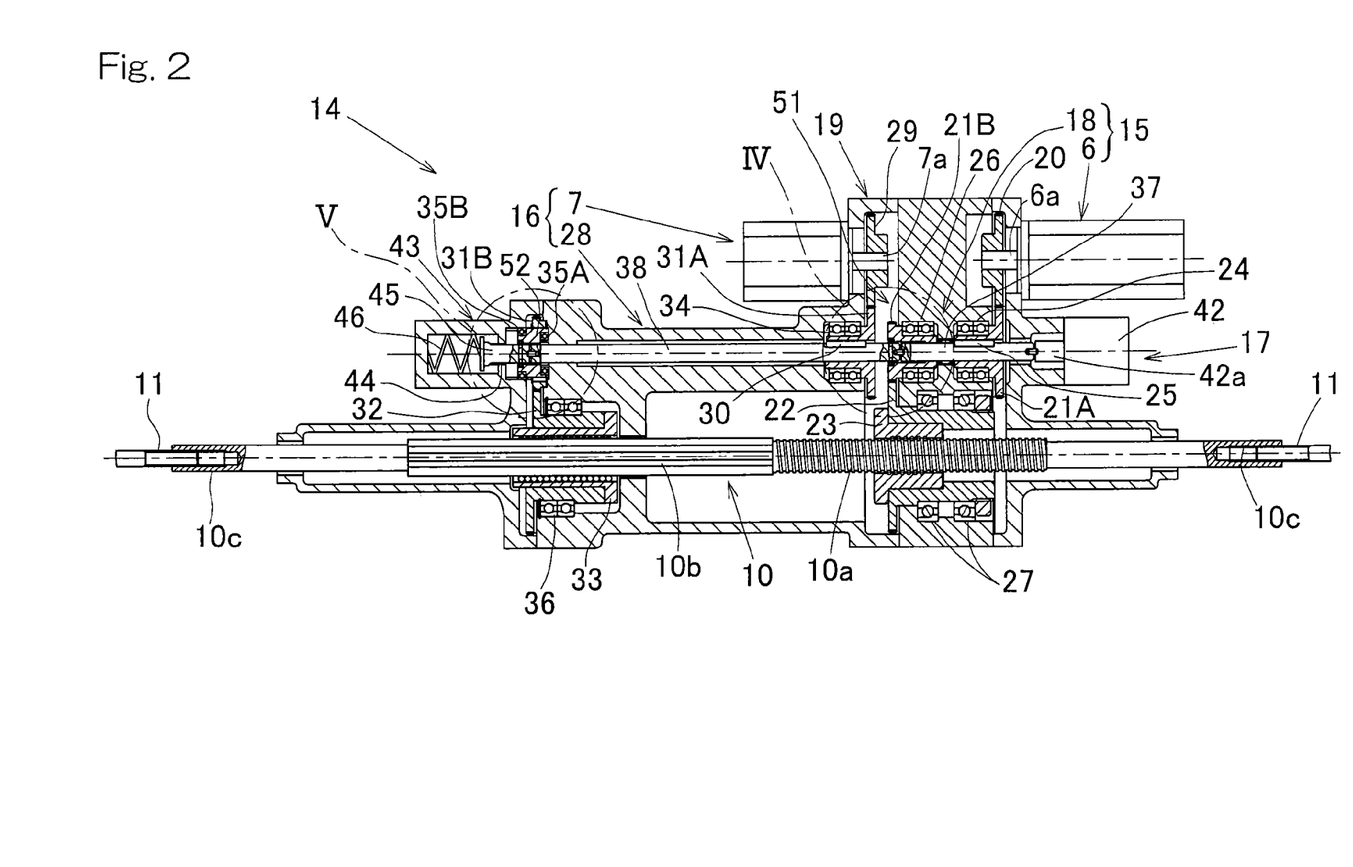
FIG. 2 is a longitudinal sectional view showing the steer-by-wire steering device of FIG. 1 in a condition with a steering shaft drive unit thereof operating normally.

FIG. 2 is a sectional view showing the details of the steering axle drive unit 14 for driving the steering axle 10 when the steering axle drive unit 14 is normally functioning. This steering axle drive unit 14 is provided with a wheel turning mechanism 15 for driving the steering axle 10 in a direction axially thereof to turn the vehicle wheels 13, a toe angle adjusting mechanism 16 for adjusting the toe angle of the wheels 13, and a switching unit 17.

The wheel turning mechanism 15 includes a wheel turning motor 6 and a turning power transmitting mechanism 18 for transmitting a turning power from the wheel turning motor 6 to the steering axle 10 to cause the vehicle wheels to be turned. The wheel turning motor 6 is supported by a housing 19 for the steering axle drive unit 14 with its output shaft 6a held in parallel to the steering axle 10. A portion (a right hand portion as viewed in FIG. 2) of the steering axle 10 is formed with a ball screw portion 10a. The turning power transmitting mechanism 18 includes an output gear 20 fixedly mounted on the output shaft 6a of the wheel turning motor 6, a first intermediate gear 21A spline-fitted to a portion of a first intermediate shaft 37, arranged parallel to the steering axle 10, and meshed with the output gear 20, a second intermediate gear 21B mounted on and spline-fitted to another portion of the first intermediate shaft 37, a ball nut 23 threadingly mounted on the ball screw portion 10a of the steering axle 10, and an input gear 22 fixed to the ball nut 23 and meshed with the second intermediate gear 21B. The turning power transmitting mechanism 18 referred to above is so designed and so configured that a rotational output of the wheel turning motor 6 can be transmitted to the ball nut 23 through the output gear 20, the first intermediate gear 21A, the first intermediate shaft 37, the second intermediate gear 21B and the input gear 22 to rotatably drive the ball nut 23 with the steering axle 10 consequently moved in a direction axially thereof to thereby turn the vehicle wheels.

The first intermediate gear 21A is supported by the housing 19 through a rolling bearing 24. The first intermediate gear 21A is fitted to the first intermediate shaft 37 through a key 25. Also, since the second intermediate gear 21B is spline-fitted to the first intermediate shaft 37, the movement of the first intermediate shaft 37 in the direction axially thereof is permitted. The second intermediate gear 21B is supported by the housing 19 through another rolling bearing 26. The input gear 22 is also supported by the housing 19 through a rolling bearing 27.

The toe angle adjusting mechanism 16 referred to previously includes a toe angle adjusting motor 7, which is another one of the steering shaft drive motors for driving the steering shaft 10, and a toe angle adjusting power transmitting mechanism 28 for transmitting a power from the toe angle adjusting motor 7 to the steering shaft 10 to perform a toe angle adjustment. The toe angle adjusting motor 7 is supported by the housing 19 for the steering shaft drive unit 14 with its output shaft 7a held parallel to the steering shaft 10. A portion (left side portion as viewed in FIG. 2) of the steering shaft 10 is formed with spline teeth 10b.

The toe angle adjusting power transmitting mechanism 28 includes an output gear 29 fixedly mounted on the output shaft 7a of the toe angle adjusting motor 7, a first intermediate gear 31A engaged with a portion of a second intermediate shaft 38 arranged coaxially with the first intermediate shaft 37 in proximate to the first intermediate shaft 37 and extending in a direction parallel to the steering axle 10, a second intermediate gear 31B mounted on and spline-fitted to another portion of the second intermediate shaft 38, an internally splined nut 33 mounted on and engaged with the splined keys 10b of the steering axle 10, and an input gear 32 fixed to the internally splined nut 33 and meshed with the second intermediate gear 31B.

Figure 4A:
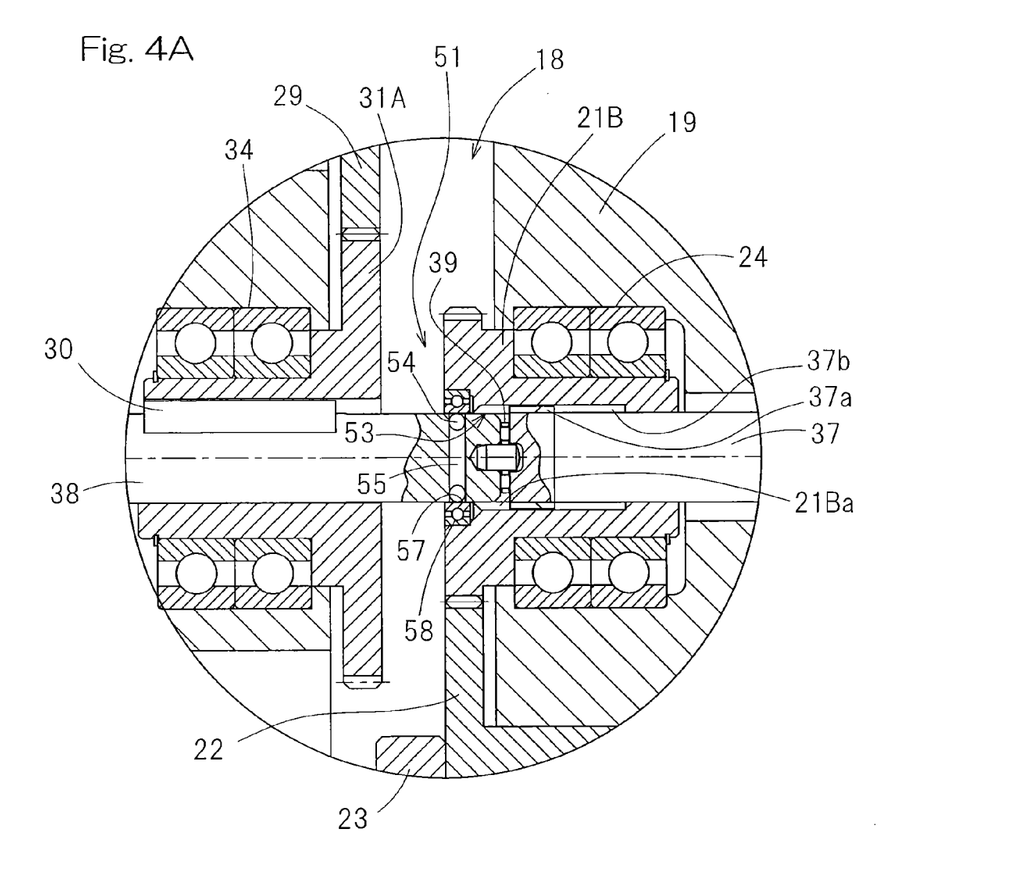
FIG. 4A is a fragmentary transverse sectional view showing, on an enlarged scale, a portion enclosed within the circle IV in FIG. 2, illustrating the steering drive unit operating normally.

Accordingly, a rotational output of the toe angle adjusting motor 7 is transmitted to the internally splined nut 33 through the output gear 29, the first intermediate gear 31A, the second intermediate shaft 38, the second intermediate gear 31B and the input gear 32 to rotatably drive the internally splined nut 33 to rotate the steering axle 10, resulting in adjustment of the toe angle of the vehicle wheels 13 by the function of toe angle adjusting screw portions 10c as will be described later. The spline teeth 10b of the steering axle 10 and the internally splined nut 33 may be of a sliding contact type or a rolling contact type. The first intermediate shaft 37 and the second intermediate shaft 38 are held in axial abutment with each other with a thrust bearing 39 (best shown in FIG. 4) interposed between their neighboring ends. Accordingly, the first and second intermediate shafts 37 and 38 are held rotatable relative to each other.

Since the first intermediate gear 31A is supported by the housing 19 through a rolling bearing 34. This first intermediate gear 31A is mounted on the second intermediate shaft 38 through a key 30 and the second intermediate gear 31B is also mounted on and spline-fitted to the second intermediate shaft 38, the second intermediate shaft 38 is permitted to move in a direction axially thereof. The second intermediate gear 31B referred to above is supported by the housing 19 through different rolling bearings 35A and 35B. The input gear 32 is as well supported by the housing 19 through a rolling bearing 36.

The toe angle adjusting mechanism 16 includes, separate from the toe angle adjusting motor 7 and the toe angle adjusting power transmitting mechanism 28, the toe angle adjusting screw portions 10c defined in each of the opposite end portions of the steering axle 10 and threadingly connected with a corresponding left or right tie rod 11. The toe angle adjusting screw portions 10c on the respective end portions of the steering axle 10 represent internally threaded portions that are threaded helically in respective senses opposite to each other so that when the steering axle 10 rotates in one of opposite directions, the left and right tie rods 11 can protrude in a direction axially outwardly of the steering axle 10, and when the steering axle 10 rotates in the other of the opposite directions, the left and right tie rods 11 can retract in a direction axially inwardly of the steering axle 10. Each of the toe angle adjusting screw portions 10c is in the form of, for example, a trapezoidal screw portion. Each of the toe angle adjusting screw portions 10c may be provided with a detent or stopper.

A switching unit 17 is so designed as to disconnect the wheel turning motor 6 from the turning power transmitting mechanism 18 and then to lock the toe angle adjusting power transmitting mechanism 28 so that the toe angle adjusting motor 7 can be converted into a drive source for wheel turning purpose. This switching unit 17 is disposed generally intermediate between the turning power transmitting mechanism 18 and the toe angle adjusting power transmitting mechanism 28 and includes a linear actuator 42 for driving the first and second intermediate shafts 37 and 38 in a direction axially thereof, a first clutch mechanism 51 for switching and transmitting the rotational output of the toe angle adjusting motor 7 from the toe angle adjusting power transmitting mechanism 28 to the turning power transmitting mechanism 18, and a locking mechanism 43 for locking the toe angle adjusting power transmitting mechanism 28.

The linear actuator 42 is in the form of, for example, a linear solenoid, a hydraulically operated cylinder or a pneumatically operated cylinder and has an actuating rod 42a held in engagement with one of the opposite ends of the first intermediate shaft 37, which is opposite to the other of those ends of the first intermediate shaft 37 then held in engagement with the second intermediate shaft 38. Although not shown, a thrust bearing is disposed between the mating ends of the first intermediate shaft 37 and the actuating rod 42a of the linear actuator 42 and, accordingly, the first intermediate shaft 37 is rotatable relative to the actuating rod 42a.

The first clutch mechanism 51 in the changeover unit 17 includes, as shown in FIG. 4A on an enlarged scale, the second intermediate shaft 38 serving as an input member, the second intermediate gear 21B having an engagement hole 53 defined therein and mounted in part on the first intermediate shaft 37, serving as an output member, and in part on an outer periphery of the first intermediate shaft 37 for rotation together therewith. The mechanism 52 further includes clutch grooves 21Ba (best shown in FIG. 4B) defined in a portion of the engagement hole 53 in the intermediate gear 21B so as to extend in a direction axially thereof, and clutch rolling elements 54 provided in the second intermediate shaft 38, serving as the input member, and selectively engageable in and out of the clutch grooves 21Ba when the first and second intermediate shafts 37 and 38 move in the axial direction.

Figure 4B:
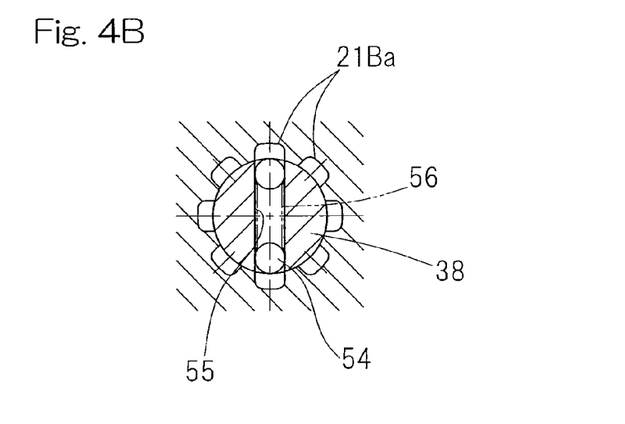
FIG. 4B is a fragmentary sectional view showing, on an enlarged scale, illustrating a clutch mechanism in that portion.

Each of the clutch grooves 21Ba is rendered to represent a trapezoidal sectional shape. The clutch rolling elements 54 are in the form of balls and are, as best shown in FIG. 4B in a transverse sectional view, accommodated within a radial accommodating hole 55 defined in the second intermediate shaft 38 so as to extend therethrough in a direction radially of the second intermediate shaft 38. The rolling elements so accommodated within the radial accommodating hole 55 are elastically urged by an elastic member 56 such as, for example, a compression spring away from each other in a direction radially of the second intermediate shaft 38. It is to be noted that as a different structure of the first clutch mechanism 52, the clutch rolling elements 54 may be provided on the side of the intermediate gear 21B while the clutch grooves 21Ba are provided on the side of the second intermediate shaft 38.

The engagement hole 53 in the second intermediate gear 21B is provided with a non-grooved surface 57 of a round sectional shape in the form of a cylindrical surface coaxial with a gear center axis, which is a center shaft in adjoining relation with an axially left side of the clutch grooves 21Ba such that when the clutch rolling elements 54 are positioned at respective locations facing the non-grooved surface 57 as shown in FIG. 4A, the power transmission from the second intermediate shaft 38 to the second intermediate gear 21B is interrupted. Also when the clutch rolling elements 54 are positioned at an axial location confronting the clutch grooves 21Ba and the phase of the clutch rolling elements 54 and the phase of the clutch grooves 21Ba match with each other, the clutch rolling elements 54 are engaged in the respective clutch grooves 21Ba by the effect of a radially outwardly acting biasing force of the elastic member 56 to permit the power to be transmitted from the second intermediate shaft 38 to the second intermediate gear 21B. In the instance as shown, with a roll bearing 58 provided in the engagement hole 53 in the second intermediate gear 21B, a peripheral surface of a rotational raceway ring of the rolling bearing 58 is rendered to be the non-grooved surface 57.

In view of the foregoing, even when the power transmission is interrupted with the clutch rolling elements 54 held at the axial location confronting the non-grooved surface 57, the rotation of the second intermediate gear 21B mounted externally on the second intermediate shaft 38 can be effected smoothly. Also, a groove bottom surface of one end of each of the clutch grooves 21Ba adjoining the non-grooved surface 57 is rendered to be a tapered surface gently inclined towards the non-grooved surface 57. Accordingly, the operation of the clutch rolling elements 54 from the location confronting the non-grooved surface 57 up until they are brought into engagement with the clutch grooves 21Ba can be effected smoothly.

The clutch grooves 21Ba in the first clutch mechanism 51, best shown in FIG. 4B, are concurrently serves as the female spline teeth with which spline teeth 37a in the first intermediate shaft 37 are engaged. The splined engagement in this case may be of the same structure as that in the first clutch mechanism 51 as hereinabove described. But since the spline teeth 37a referred to above changes from an engaged condition to a disengaged condition as will be discussed later and no operation towards an engagement takes place, the reliability of the operation will not be adversely affected even with the splined engagement.

The engagement hole 53 in the second intermediate gear 21B is provided with a sheltering space 37b for the spline teeth 37a, which space 37b is positioned on a right side of the clutch grooves 21Ba in the axial direction. Accordingly, in a condition in which the clutch rolling elements 54 are engaged in the clutch grooves 21Ba and the power is ready to be transmitted from the second intermediate shaft 38 to the second intermediate gear 21B, the second intermediate gear 21B is disconnected from the first intermediate shaft 37.

The locking mechanism 43 for the changeover unit 17 shown in FIG. 2 and described hereinabove includes a third intermediate shaft 45 spline-fitted to a splined hub 44 formed in the housing 19, and disposed in coaxial relation with the first and second intermediate shafts 37 and 38 and adjoining to the second intermediate shaft 38, and a coiled spring 46 for elastically urging the third intermediate shaft 45 to push the second intermediate shaft 35 towards an advanced side to push the second intermediate shaft 38. The locking mechanism 43 further includes a second clutch mechanism 52 for selectively connecting and disconnecting the second intermediate gear 31B in the toe angle adjusting power transmitting mechanism 28 with or from the third intermediate shaft 45. A thrust bearing 41 is interposed between respective mating ends of the third intermediate shaft 45 and the second intermediate shaft 38 so that the second intermediate shaft 38 can be rotatable relative to the third intermediate shaft 45.

Figure 5A:
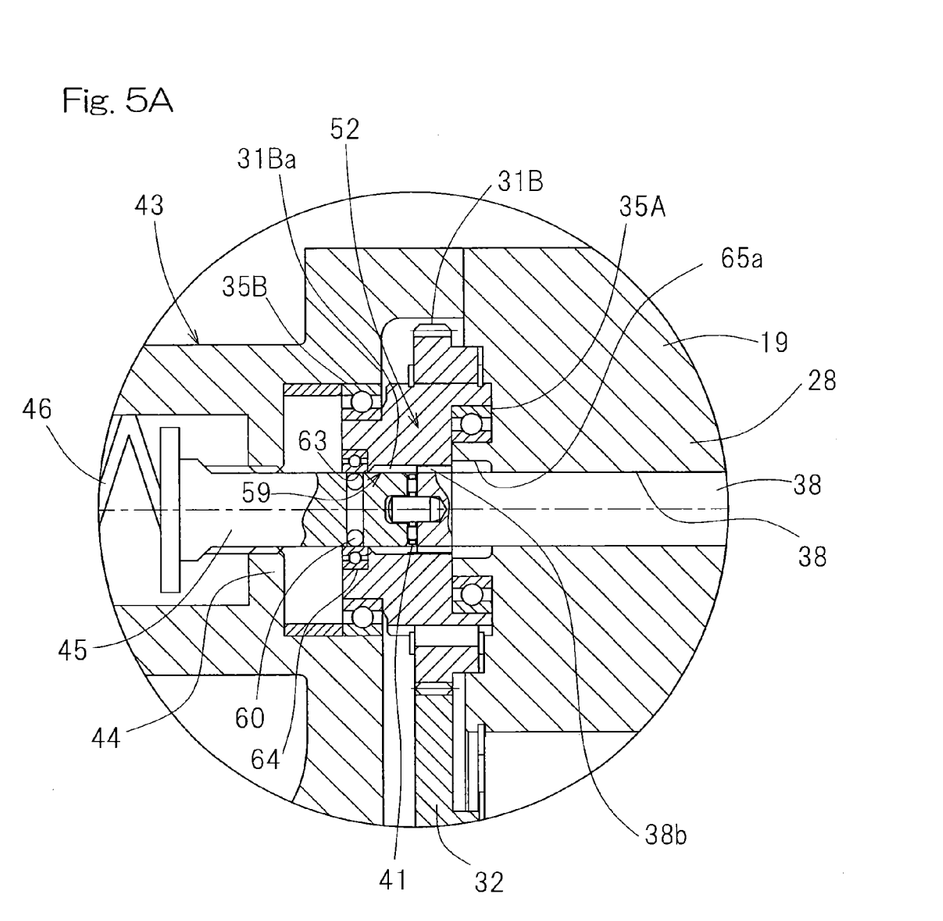
FIG. 5A is a fragmentary transverse sectional view showing, on an enlarged scale, a portion enclosed within the circle V in FIG. 2, illustrating the steering drive unit operating normally.

The second clutch mechanism 52 referred to above is substantially similar in structure to the first clutch mechanism 51 shown in and previously described with particular reference to FIGS. 4A and 4B. Specifically, as best shown in FIG. 5A, the second clutch mechanism 52 includes the previously described third intermediate shaft 45 serving as an input member, the second intermediate gear 31B of the toe angle adjusting power transmitting mechanism 28, which has an engagement hole 59 defined therein and mounted on an outer periphery of the third intermediate shaft 45 for rotation together with the second intermediate shaft 38, serving as an output member, and the third intermediate shaft 45 rotatable together with such second intermediate shaft 38. The second clutch mechanism 52 further includes clutch grooves 31Ba provided in a portion of the engagement hole 59 in the intermediate gear 31B so as to extend in a direction axially thereof, and clutch rolling elements 60 provided in the third intermediate shaft 45, serving as the input member, and selectively engageable in and out of the clutch grooves 31Ba when the second and third intermediate shafts 38 and 45 move in the axial direction.

Figure 5B:
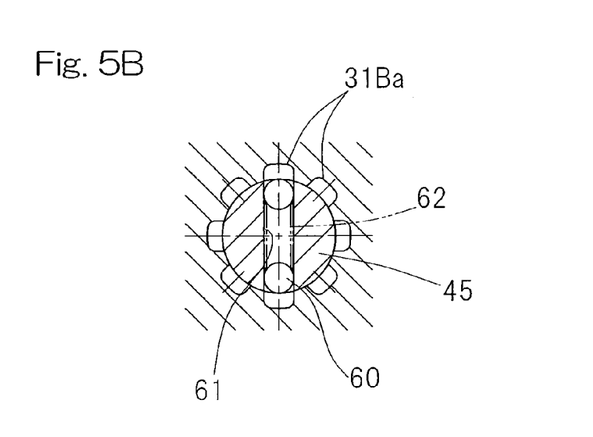
FIG. 5B is a fragmentary sectional view showing, on an enlarged scale, illustrating a clutch mechanism in that portion.

Each of the clutch grooves 31Ba is rendered to represent a trapezoidal sectional shape. The clutch rolling elements 60 are in the form of balls and are, as best shown in FIG. 5B in a transverse sectional view, accommodated within a radial accommodating hole 61 defined in the third intermediate shaft 45 so as to extend therethrough in a direction radially of the third intermediate shaft 45. The clutch rolling elements 60 so accommodated within the radial accommodating hole 61 are elastically urged or biased by an elastic member 62 such as, for example, a compression spring away from each other in a direction radially of the third intermediate shaft 45. It is to be noted that as a different structure of the second clutch mechanism 52, the clutch rolling elements 60 may be provided on the side of the intermediate gear 31B while the clutch grooves 31Ba are provided on the side of the third intermediate shaft 45.

The engagement hole 59 in the second intermediate gear 31B is provided with a non-grooved surface 63 of a round sectional shape in adjoining relation to an axial left side of the clutch grooves 31Ba in the drawing such that when the clutch rolling elements 60 are positioned at respective axial locations facing the non-grooved surface 63 as shown in FIG. 5A, the second intermediate gear 31B is disengaged from the third intermediate shaft 45. Also when the clutch rolling elements 60 are positioned at an axial location confronting the clutch grooves 31Ba with the phase of the clutch rolling elements 60 and the phase of the clutch grooves 31Ba matched with each other, the clutch rolling elements 60 are engaged in the respective clutch grooves 31Ba by the effect of a radially outwardly acting urging force of the elastic member 62 to permit the second intermediate gear 31B to be engaged with the third intermediate shaft 45 with the toe angle adjusting power transmitting mechanism 28 locked consequently. In the instance as shown, with a roll bearing 64 provided in the engagement hole 59 in the third intermediate gear 31B, a peripheral surface of a rotational raceway ring of the rolling bearing 64 is rendered to be the non-grooved surface 63.

Accordingly, even under an disconnected condition in which the clutch rolling elements 60 are held in the axial location confronting the non-grooved surface 63, it is possible to allow the second intermediate gear 31B, mounted externally on the second intermediate shaft 38, to be rotated smoothly. Also, Also, a groove bottom surface of one end of each of the clutch grooves 31Ba adjoining the non-grooved surface 63 is rendered to be a tapered surface gently inclined towards the non-grooved surface 63. Accordingly, the operation of the clutch rolling elements 60 from the location confronting the non-grooved surface 63 up until they are brought into engagement with the clutch grooves 31Ba can be effected smoothly.

The clutch grooves 31Ba in the second clutch mechanism 52 are concurrently serves as the female spline teeth with which spline teeth 38b in the second intermediate shaft 38 are engaged. The splined engagement in this case may be of the same structure as that in the first clutch mechanism 52 as hereinabove described. But since the spline teeth 38b referred to above changes from an engaged condition to a disengaged condition as will be discussed later and no operation towards an engagement takes place, the reliability of the operation will not be adversely affected even with the splined engagement. An intermediate throughhole 65 in the housing 19, through which the second intermediate shaft 38 extends, is provided with a sheltering space 65a for the spline teeth 38a, which space 65a is positioned on a right side of the clutch grooves 31Ba in the axial direction. Accordingly, in a condition in which the clutch rolling elements 60 are engaged in the clutch grooves 31Ba, the second intermediate gear 31B is connected with the third intermediate shaft 37 with the toe angle adjusting power transmitting mechanism 28 brought in a locked condition consequently.

The condition shown in FIG. 2, which illustrates the turning motor 6 is operating normally, is a condition in which the linear actuator 42 does not operate. At this time, as shown in FIG. 4A on an enlarged scale, the spline teeth 37a of the first intermediate shaft 37 are spline engaged with the clutch grooves 21Ba of the clutch mechanism 51, that is, the clutch grooves 21Aa of the engagement hole 53 in the second intermediate gear 21B of the turning power transmitting mechanism 18. Also, as shown in FIG. 5A on an enlarged scale, the spline teeth 38b of the second intermediate shaft 38 are spline engaged with the clutch grooves 31Ba of the second clutch mechanism 52, that is, the clutch grooves 31Ba of the second intermediate gear 31B of the toe angle adjusting power transmitting mechanism 28.

Figure 3:
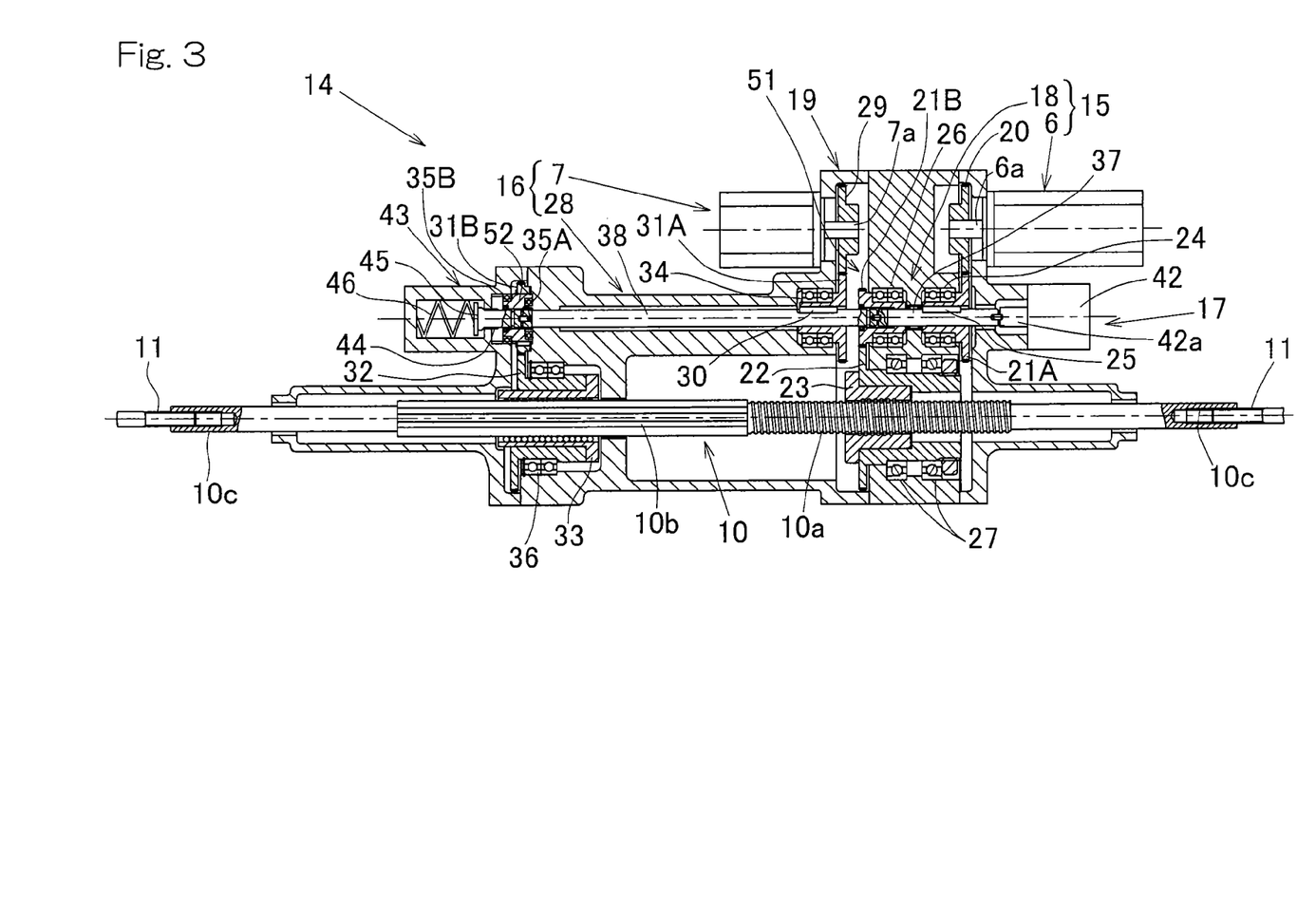
FIG. 3 is a longitudinal sectional view showing the steer-by-wire steering device of FIG. 1 in a condition with a steering motor in the steering shaft drive unit failing to operate properly.
Figure 6A:
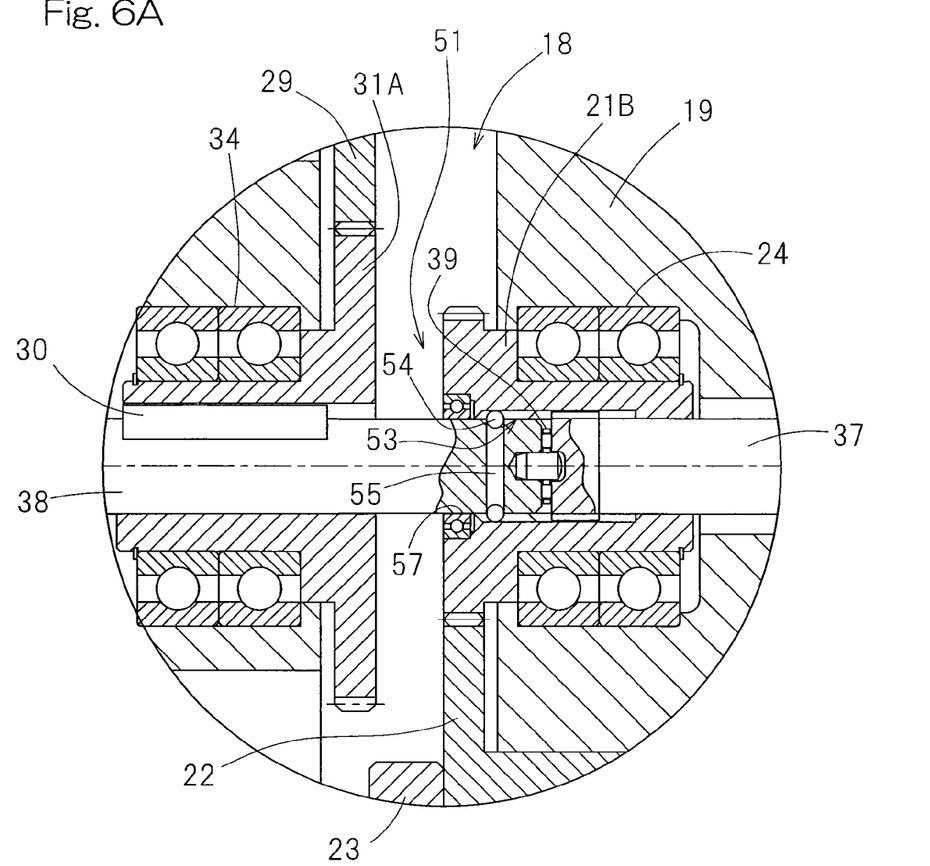
FIG. 6A is a fragmentary transverse sectional view showing, on an enlarged scale, that portion shown in FIG. 4A, with a steering motor failing to operate properly.
Figure 6B:
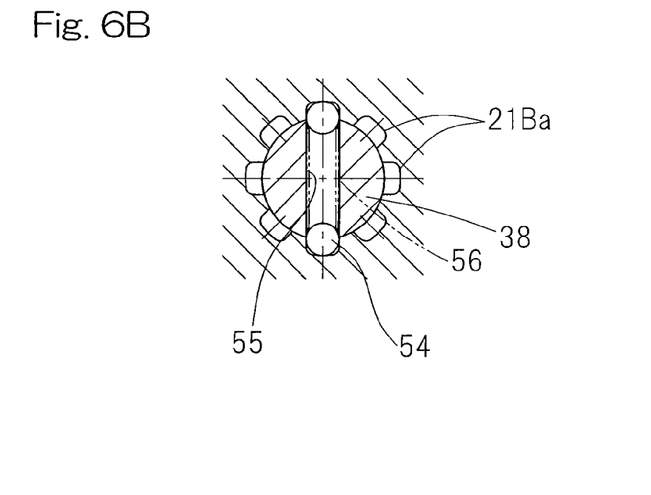
FIG. 6B is a fragmentary transverse sectional view showing, on an enlarged scale, the clutch mechanism appearing in that portion.

FIG. 3 illustrates the condition in which the linear actuator 42 is operated, that is, the turning motor 6 fails to operate properly. At this time, the actuating rod 42a of the linear actuator 42 is retracted and the first and second intermediate shafts 37 and 38 are urged by the third intermediate shaft 45 forming a part of the locking mechanism 43 to move in the axial direction on a right side of FIG. 3. By this movement, in the turning power transmitting mechanism 18, as shown in FIG. 6A on an enlarged scale, the spline teeth 37a in the first intermediate shaft 37, which have been engaged with the clutch grooves 21Ba of the clutch mechanism 51, are moved into the sheltering space 37b to be released from the engagement and, instead, the clutch rolling elements 54 in the second intermediate shaft 38 are engaged with the clutch grooves 21Ba in the second intermediate gear 21B. In other words, as a drive source for the turning mechanism 15, in place of the wheel turning motor 6 the toe angle adjusting motor 7 is connected with the turning power transmitting mechanism 18.

Figure 7A:
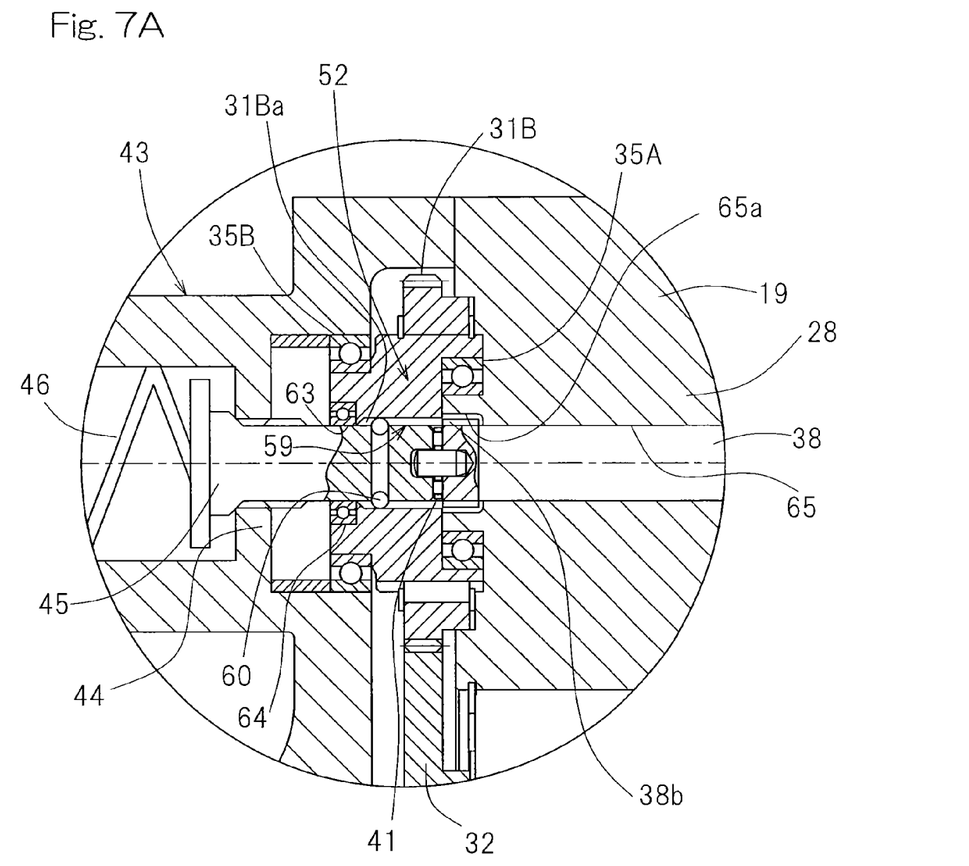
FIG. 7A is a fragmentary transverse sectional view showing, on an enlarged scale, that portion shown in FIG. 5A, with the steering motor failing to operate properly.
Figure 7B:
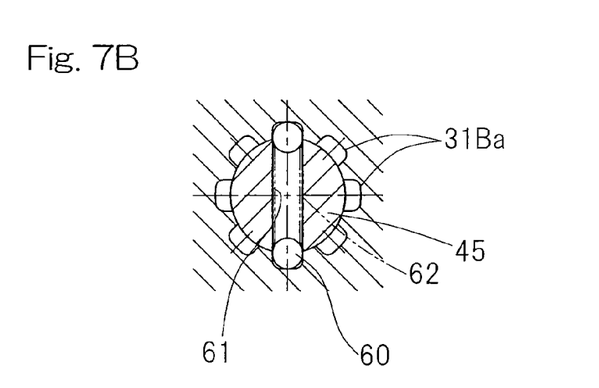
FIG. 7B is a fragmentary longitudinal sectional view showing, on an enlarged scale, the clutch mechanism appearing in that portion.

On the other hand, in the toe angle adjusting power transmitting mechanism 28, as shown in FIGS. 7A and 7B, the spline teeth 38b in the second intermediate shaft 38, which have been engaged with the clutch grooves 31Ba in the second intermediate gear 31B, are disengaged from the engagement and, in place thereof, the clutch rolling elements 60 in the third intermediate shaft 45 are brought into engagement with the clutch grooves 31Ba in the second intermediate gear 31B. In other words, the toe angle adjusting motor 7 is disconnected from the toe angle adjusting power transmitting mechanism 28 and, at the same time, the toe angle adjusting power transmitting mechanism 28 is locked by the locking mechanism 43.

As shown in FIG. 1, the steering control section 5a of the ECU 5 controls the steering reactive force motor 4, the wheel turning motor 6, the toe angle adjusting motor 7 and the linear actuator 42 (FIG. 2) of the switching unit 17. More specifically, the steering control section 5a is operable to set a target steering reactive force based on a signal indicative to the steering angle detected by the steering angle sensor 2, a signal indicative of the wheel rotational speed detected by a vehicle speed sensor (not shown) and various signals detected of vehicle operating conditions, and then to feed back a signal indicative of the steering torque, detected by the steering torque sensor 3, so that the actual steering reactive force torque may match with the target steering reactive force to thereby control the steering reactive force motor 4. The steering control section 5a shown in FIG. 1 is also operable to activate the linear actuator 42, forming the switching unit 17, in the event of failure of the wheel turning motor 6 to thereby disconnect the wheel turning motor 6 from the wheel turning power transmitting mechanism 18, lock the toe angle adjusting power transmitting mechanism 28 and effect the wheel diversion by means of the toe angle adjusting motor 7.

The operation taking place in the steering axle drive unit 14 of the steer-by-wire steering device will now be described in detail. In the event that the wheel turning motor 6 functioning normally, as best shown in FIG. 2, not only is the rotation of the output shaft 6a of the wheel turning motor 6 transmitted to the ball nut 23 through the wheel turning power transmitting mechanism 18, but the rotation of the output shaft 7a of the toe angle adjusting motor 7 is also transmitted to the internally splined nut 33 through the toe angle adjusting power transmitting mechanism 28. Rotation of the ball nut 23 engaged with the ball screw portion 10a of the steering axle 10 results in the axial movement of the steering axle 10 to thereby turn the wheels 13. Since the internally splined nut 33 of the toe angle adjusting power transmitting mechanism 28 is mounted on the steering axle 10 with the internal thread thereof engaged with the spline serrations 10b of the steering axle 10, the steering axle 10 is driven to move in the direction axially thereof. Rotation of the internally splined nut 33 engaged with the spline serrations 10b of the steering axle 10 results in rotation of the steering axle 10, which in turn results in advance or retraction of the tie rods 11 that are engaged with the toe angle adjusting screw portions 10c at the opposite ends of the steering axle 10, thereby performing a toe angle adjustment.

In the event of failure of the turning motor 6 shown in FIG. 1, in response to a command from the steering control section 5a in the electric control unit 5, as shown in FIG. 2, the linear actuator 42 forming a part of the changeover unit 17 is actuated, resulting in retraction of the actuating rod 42a. In response to the retraction of the actuating rod 32a so effected, the third intermediate shaft 45 of the locking mechanism 43 is urged by the biasing force of the coiled spring 46, resulting in the axial rightward movement of the first and second intermediate shafts 37 and 38 as shown in FIG. 3. At this time, the spline teeth 37a in the first intermediate shaft 37 are disengaged from the clutch grooves 21Ba in the second intermediate gear 21B of the turning power transmitting mechanism 18, and then the clutch rolling elements 54 in the second intermediate shaft 38 are brought into engagement with the clutch groove 21Ba in the intermediate gear 21B. Hence, the drive source for the turning mechanism 15 is switched over from the wheel turning motor 6 to the toe angle adjusting motor 7.

On the other hand, in the toe angle adjusting power transmitting mechanism 28, the spline teeth 38b in the second intermediate shaft 38 are disengaged from the clutch grooves 31Ba (best shown in FIG. 5A) in the second intermediate gear 31, and then the clutch rolling elements 60 in the third intermediate shaft 45 of the locking mechanism 43 are brought into engagement with the clutch grooves 31Ba in the intermediate gear 31B with the toe angle adjusting power transmitting mechanism held consequently in a locked condition. In other words, the toe angles of the vehicle wheels 13 are maintained constant.

During the above described switching operation, the use is made of the first clutch mechanism 51 for selectively connecting and disconnecting the clutch rolling elements 54 with and from the clutch groove 21Ba as shown in FIG. 4A and the second clutch mechanism 52 for selectively connecting and disconnecting the clutch rolling elements 60 with and from the clutch grooves 31Ba as shown in FIG. 5A. Accordingly, when the respective phases of the rolling elements 54 and 60 match with the phases of the associated clutch grooves 21Ba and 31Ba with each other, the clutch rolling elements 54 and 60 engage with the corresponding clutch grooves 21Ba and 31Ba. Therefore, during such switching operation, there is no need to make the phases to be matched with each other and the assured switching operation can be accomplished with the time reduced.

Also, in the steer-by-wire steering device, separate from the wheel turning motor 6 and the wheel turning power transmitting mechanism 18 shown in FIG. 2 for transmitting the power from the wheel turning motor 6 to the steering axle 10 to perform the wheel turning, the use is made of the toe angle adjusting motor 7 and the toe angle adjusting power transmitting mechanism 28 for transmitting the power from the toe angle adjusting motor 7 to the steering axle 10. Furthermore, the switching unit 17 is interposed between the wheel turning power transmitting mechanism 18 and the toe angle adjusting power transmitting mechanism 28 to disconnect the wheel turning motor 6 from the wheel turning power transmitting mechanism 18 and then to lock the toe angle adjusting power transmitting mechanism 28 thereby to cause the toe angle adjusting motor 7 to perform the wheel turning operation in the event of failure of the wheel turning motor 6. Accordingly, even though the wheel turning motor 6 used to turn the vehicle wheels 13 fails, the toe angle adjusting motor 7 can be used as a drive source for turning the vehicle wheels 13. Also, even when and so long as the wheel turning motor 6 is functioning normally, the toe angle adjusting motor 7 works as a drive source for adjusting the toe angle of the vehicle wheels 13 and, therefore, the system as a whole can be constructed at an inexpensive cost as compared with the conventional case in which an auxiliary motor that is operated only upon failure of the wheel turning motor 6 is required.

It is to be noted that since the toe angle adjustment by means of the toe angle adjusting motor 7 and the use of the toe angle adjusting motor 7 as a drive source for wheel turning in the event of failure of the wheel turning motor 6 takes place one at a time during the travel of the vehicle, the maximum generated torque thereof is far lower than the torque required by the wheel turning motor 6 during the stationary steering.

Accordingly, the toe angle adjusting motor 7 may have a size smaller than the wheel turning motor 6.

In the preferred embodiment of the present invention hereinabove described, although in the first clutch mechanism 51, shown in FIG. 4A, of the changeover unit 17, the clutch rolling elements 54 has been shown and described as positioned at a single axial location, the torque capacity of the power transmission may be increased by positioning the clutch rolling elements 54 at a plurality of axial locations. This equally applies to the second clutch mechanism 52 in the locking mechanism 43, shown in FIG. 5A, of the changeover unit 17.

Figure 8A:
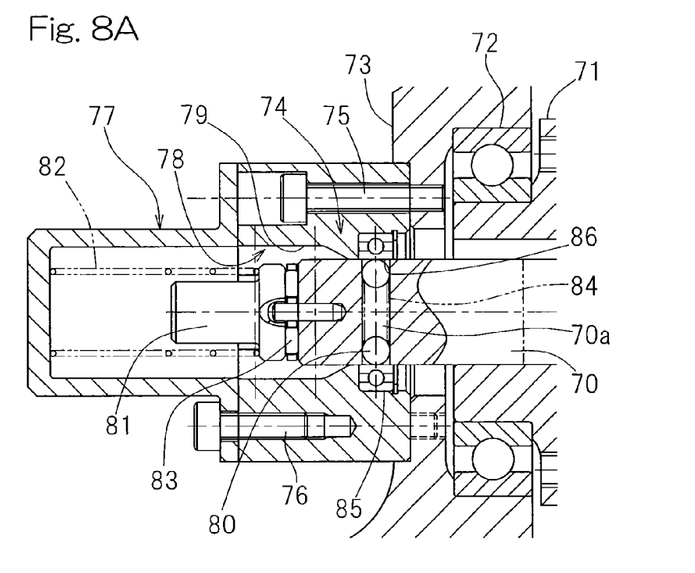
FIG. 8A is a fragmentary enlarged sectional view of a suggested example, in which the clutch mechanism used in the steer-by-wire steering device according to the preferred embodiment of the present invention is applied, showing a clutch disengaged condition.
Figure 8B:
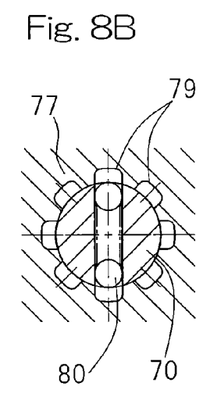
FIG. 8B is an enlarged longitudinal sectional view of the clutch mechanism in that portion.

FIGS. 8A and 8B and FIGS. 9A and 9B illustrate respectively a suggestion in which the first and second clutch mechanisms 51 and 52 employed in the steer-by-wire steering device of the present invention are used in a different power transmitting device. In this power transmitting device, as shown in FIG. 8A, a gear 71 fixed to a rotary shaft 70 is supported by a housing 73 through a rolling bearing 72, and a clutch mechanism 74 for selectively fixing the rotary shaft 70 relative to the housing 73 is provided at a shaft end portion of the rotary shaft 70. The clutch mechanism 74 includes the rotary shaft 70, a tubular member 77 fixed to the housing 73 by means of bolts 75 and 76 and having an engagement hole 78 defined therein, in which the rotary shaft 70 is engaged to be movable in a direction axially thereof, clutch grooves 79 defined in the engagement hole 78 of the tubular member 77 so as to extend in the axial direction, and clutch rolling elements 80 provided in the rotary shaft 70. Each of the clutch grooves 79 is of a sectional shape similar to a trapezoidal shape as shown in FIG. 8B.

A rotary shaft receiving member 81 confronting one end of the rotary shaft 70 is accommodated within the tubular member 77 and is elastically urged through a thrust bearing 83 to that end of the rotary shaft 70 by the effect of a compression spring 82. The opposite end of the rotary shaft 70 remote from the rotary shaft receiving member 81 is provided with a pressurizing unit, not shown, such as, for example, a linear actuator and, accordingly, the gear 71 is axially movably and rotatably supported. The clutch rolling elements 80 are in the form of balls and accommodated within a rolling element accommodating hole 70a defined in the rotary shaft 70 so as to extend radially therethrough and is biased by a spring 84 in a direction radially outwardly. Also, the engagement hole 78 in the tubular member 77 is provided with a rolling bearing 85 axially adjoining to the clutch grooves 79, and a peripheral surface of a rotational raceway ring of this rolling bearing 85 is rendered to be a non-grooved surface 86 adjoining to the clutch grooves 78.

Figure 9A:
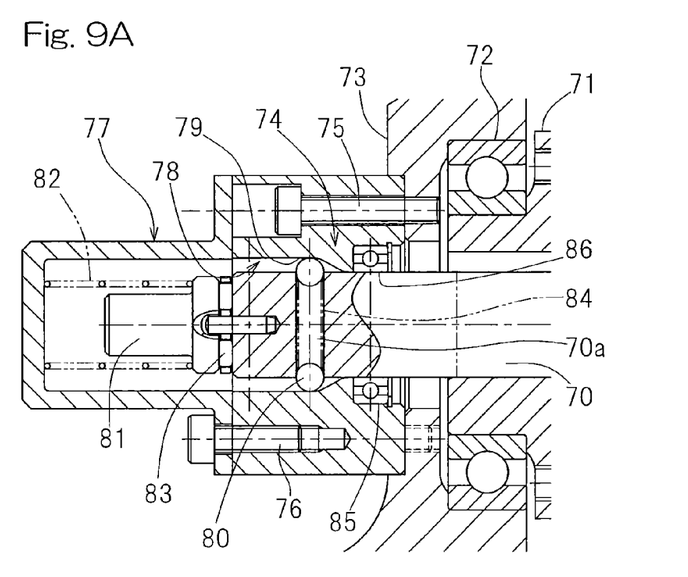
FIG. 9A is a fragmentary enlarged sectional view showing the suggested example of FIG. 8A in a clutch connected condition.
Figure 9B:
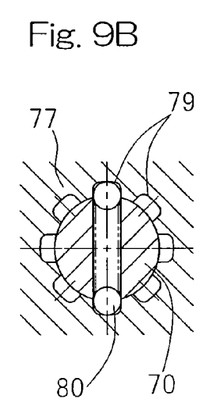
FIG. 9B is an enlarged longitudinal sectional view of the clutch mechanism in that portion.

In this power transmitting device, in a condition in which the rotary shaft 70 is not axially pressed by the pressurizing unit, as shown in FIG. 8A, the clutch rolling elements 80 are held at an axial position confronting the non-grooved surface 86 in the tubular member 77. In this condition, since the clutch rolling elements 80 are not engaged in the clutch grooves 79 as shown in FIG. 8B, the gear 71 shown in FIG. 8A becomes rotatable. When from this condition the rotary shaft 70 is pressed by the pressurizing unit to move in an axially leftward direction as shown in FIG. 9A, the clutch rolling elements 80 comes to an axial location confronting the clutch grooves 79 in the tubular member 77. Since in this condition the clutch rolling elements 80 are engaged in the clutch grooves 79 as shown in FIG. 9B, the gear 71, best shown in FIG. 9A, is locked in a non-rotatable condition. Even in this case, when the clutch rolling elements 80 and the clutch grooves 79 are matched in phase with each other, the clutch rolling elements 80 engage in the clutch grooves 79. Therefore, in switching the power transmission, there is no need to match the phases of the clutch rolling elements 80 and the clutch grooves 79 with each other and the switching operation can be accomplished assuredly and in a short time.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 Steering wheel
2 Steering angle sensor
4 Steering reactive force motor
5a Steering control section
6 Turning motor (Steering shaft drive motor)
7 Toe angle adjusting motor (Steering shaft drive motor)
10 Steering axle
17 Changeover unit
18 Turning power transmitting mechanism
19 Housing
21B Intermediate gear of turning power transmitting mechanism (Output member)
21Ba Clutch groove
23 Ball nut
28 Toe angle adjusting power transmitting mechanism
31B Intermediate gear of the toe angle adjusting power transmitting mechanism
31Ba Clutch groove
33 Splined nut
37 First intermediate shaft (Output member)
38 Second intermediate shaft (Input member, Output member)
37a, 38a, 38b Spline teeth
39, 41 Thrust bearing
42 Linear actuator
44 Splined hub
45 Third intermediate shaft (Input member)
45a Spline teeth
51, 52 Clutch mechanism
53, 59, 78 Engagement hole
21B, 31B, 77 Member having the engagement hole
54 Clutch rolling element
56 Elastic member
57 Non-grooved surface
58 Rolling bearing
60 Clutch rolling element
62 Elastic member
63 Non-grooved surface
64 Rolling bearing

What is claimed is:

1. A steer-by-wire steering device comprising:
a steering wheel not mechanically connected with a steering shaft for turning;
a steering angle sensor for detecting a steering angle of the steering wheel;
a steering reactive force motor for applying a reactive force torque to the steering wheel;
a steering shaft drive motor for driving the steering shaft;
a steering control unit for controlling the steering reactive force motor and the steering shaft drive motor, the steering control unit controlling the steering shaft drive motor on the basis of a driving condition detection signal including a signal indicative of the steering angle detected by the steering angle sensor;

a power transmitting mechanism for transmitting a power from the steering shaft drive motor to the steering shaft; and a changeover unit disposed at a location generally intermediate of the power transmitting mechanism for switching between a condition for transmitting the power and a condition for interrupting the power;

wherein the changeover unit includes;

a clutch mechanism comprising an input member and an output member juxtaposed in an axial direction with respective ends thereof held in contact with each other for movement in the axial direction and, also, rotatable relative to each other, a clutch groove provided in one of the input member and the output member so as to extend axially, and a clutch rolling element provided in the other of the input member and the output member and being selectively engaged and disengaged in and from the clutch groove as biased by an elastic member in a radial direction upon relative movement of the input and output members in the axial direction.

2. The steer-by-wire steering device as claimed in claim 1, in which one of the input member and the output member is a shaft member, and the other of the input member and the output member is a member connected with the shaft member for rotation together therewith and having an engagement hole for engagement with an outer periphery of such one of the members in an axially relatively movable fashion.

3. The steer-by-wire steering device as claimed in claim 1, in which as the power transmitting mechanism, separate from a turning power transmitting mechanism for transmitting the power from the turning motor, which is one of the steering shaft drive motors, to the steering shaft, there is provided a toe angle adjusting power transmitting mechanism for transmitting from a toe angle adjusting motor, which is another one of the steering shaft drive motors, to the steering shaft to perform a toe angle adjustment such that in the event of failure of the turning motor, the power of the toe angle adjusting motor is transmitted by the clutch mechanism of the changeover unit to the turning power transmitting mechanism to enable the toe angle adjusting motor to perform the turning.

4. The steer-by-wire steering device as claimed in claim 3, in which the changeover unit comprises a second clutch mechanism, which is identical in structure with the first mentioned clutch mechanism and having the output member axially movably, but non-rotatably supported relative to a housing such that when the turning is to be performed by means of the for angle adjusting motor, the toe angle adjusting power transmitting mechanism is locked by the second clutch mechanism of the changeover unit.

5. The steer-by-wire steering device as claimed in claim 1, in which a member of the input member and the output member in the clutch mechanism, which is provided with the clutch mechanism, is provided with a round sectioned non-grooved surface coaxial with a center axis of a member so as to be juxtaposed axially in adjoining relation to the clutch groove, the power transmission from the input member to the output member being interrupted when the clutch rolling element assumes an axial position confronting the non-grooved surface, but when the clutch rolling element assumes an axial position confronting the clutch groove, the clutch rolling element engages in the clutch groove to enable the power transmission from the input member to the output member.

6. The steer-by-wire steering device as claimed in claim 1, in which a member of the input member and the output member in the clutch mechanism, which is provided with the clutch groove, is provided with a bearing that is axially neighboring the clutch groove, the power transmission from the input member to the output member being interrupted when the input member and the output member are axially moved by the effect of an external force and the clutch rolling element assumes an axial position confronting a raceway ring peripheral surface of the bearing, but when the clutch rolling element assumes an axial position confronting the clutch groove, the clutch rolling element engages in the clutch groove to enable the power transmission from the input member to the output member.

7. The steer-by-wire steering device as claimed in claim 6, in which the bearing is a rolling bearing.

8. The steer-by-wire steering device as claimed in claim 1, in which the clutch rolling element is radially biased by a spring.

9. The steer-by-wire steering device as claimed in claim 1, in which the clutch groove has a sectional shape which is trapezoidal.

10. The steer-by-wire steering device as claimed in claim 5, in which the clutch groove has a groove bottom surface at one end adjoining the non-grooved surface, which groove bottom surface is rendered to be a tapered surface gently inclined towards the non-grooved surface.

11. The steer-by-wire steering device as claimed in claim 1, in which the clutch rolling element is a ball.

12. The steer-by-wire steering device as claimed in claim 1, in which the clutch rolling element is a pin.

13. The steer-by-wire steering device as claimed in claim 1, in which a position of installation of the clutch rolling element is a plurality of positions adjoining to each other in an axial direction.

* * * * *

UNITED STATES PATENT AND TRADEMARK OFFICE
CERTIFICATE OF CORRECTION

| | |
|---|---|
| PATENT NO. | : 8,567,552 B2 |
| APPLICATION NO. | : 13/696910 |
| DATED | : October 29, 2013 |
| INVENTOR(S) | : Tomohiro Sugai |

It is certified that error appears in the above-identified patent and that said Letters Patent is hereby corrected as shown below:

In the Specification:
In Column 1, Line 7, Delete "non" and insert -- priority --, therefor.

In the Claims:
In Column 15, Line 52, In Claim 4, Delete "for angle" and insert -- toe angle --, therefor.

Signed and Sealed this
Twenty-fifth Day of February, 2014

Michelle K. Lee
*Deputy Director of the United States Patent and Trademark Office*